Dec. 18, 1962  G. H. REVERMAN  3,068,563
METAL JOINING METHOD
Filed Nov. 5, 1958  2 Sheets-Sheet 1
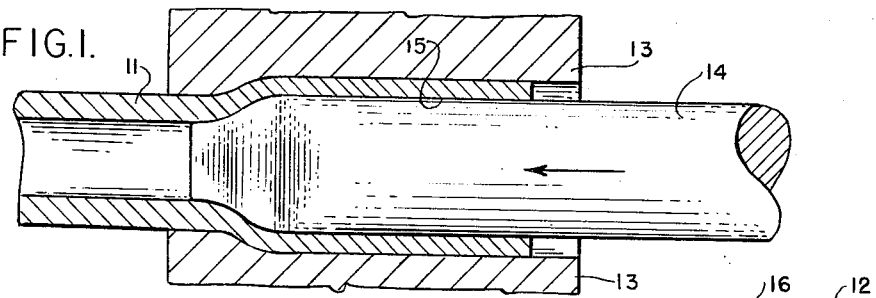
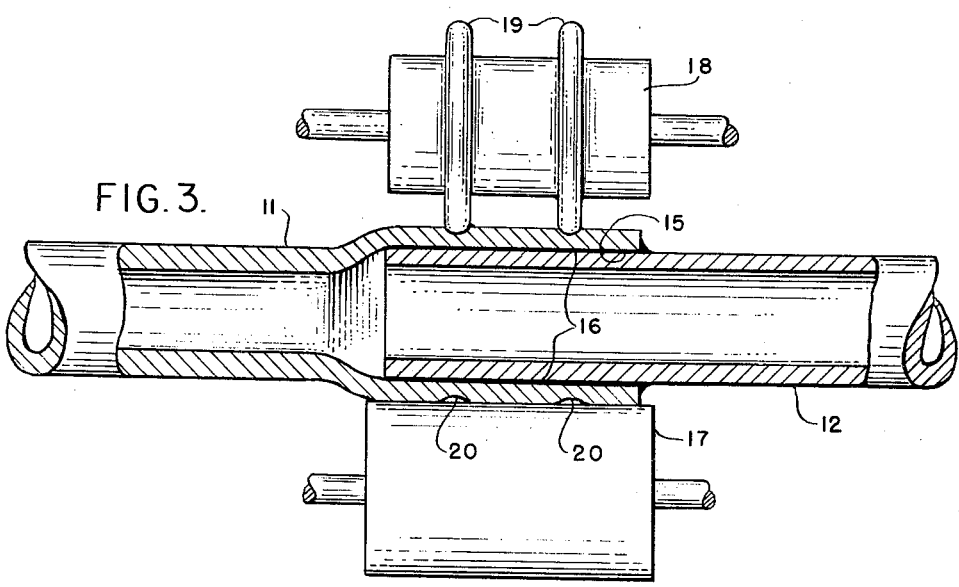
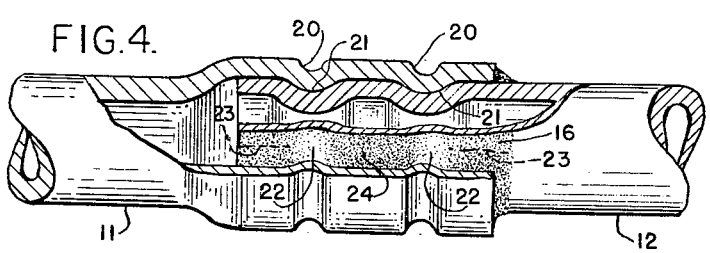
INVENTOR
GEORGE H. REVERMAN
BY *William J Foley*
ATTORNEY Dec. 18, 1962 G. H. REVERMAN 3,068,563
METAL JOINING METHOD
Filed Nov. 5, 1958 2 Sheets-Sheet 2
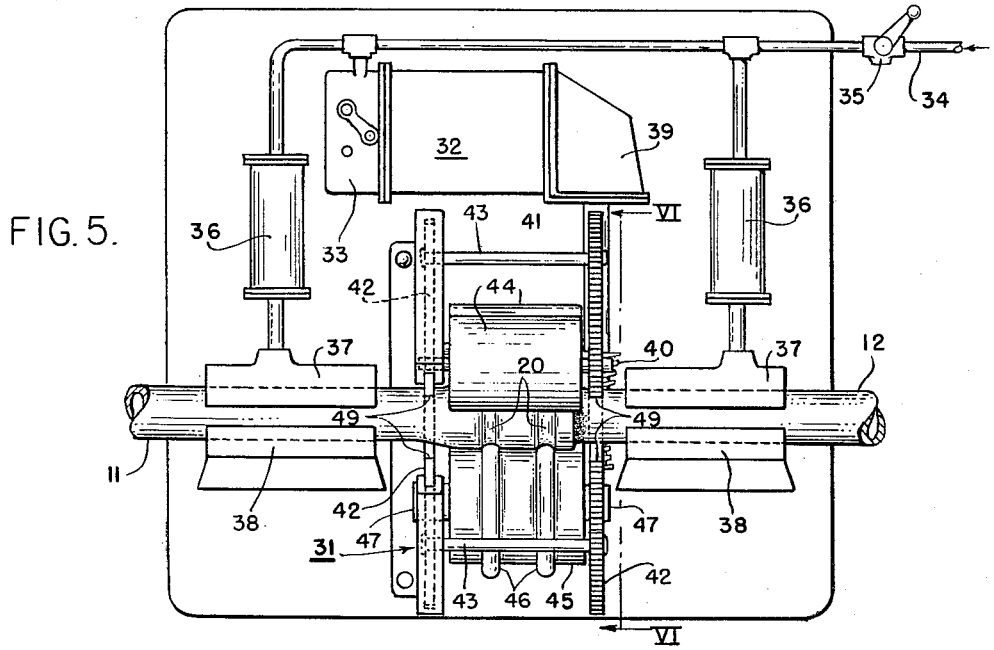
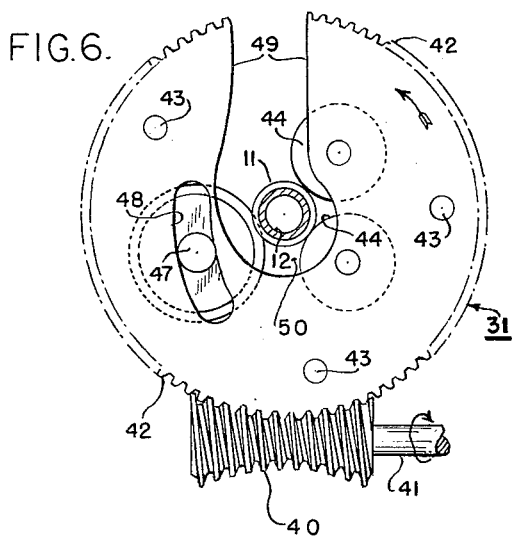
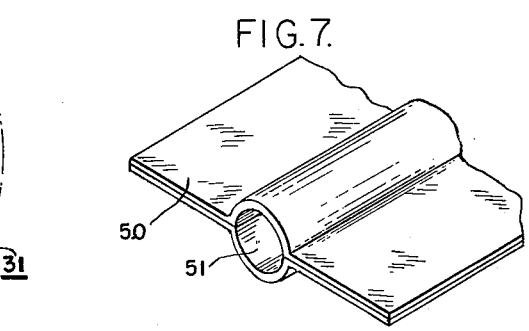
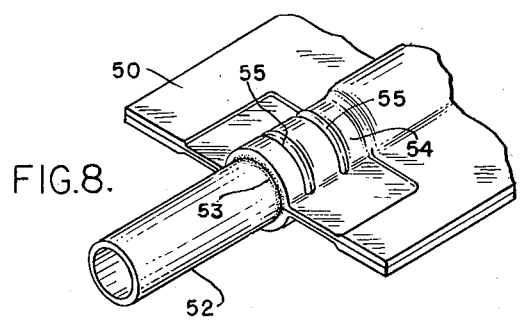
INVENTOR
GEORGE H. REVERMAN
BY *William J. Foley*
ATTORNEY United States Patent Office 3,068,563
Patented Dec. 18, 1962

3,068,563
METAL JOINING METHOD
George H. Reverman, Columbus, Ohio, assignor to Westinghouse Electric Corporation, East Pittsburgh, Pa., a corporation of Pennsylvania
Filed Nov. 5, 1958, Ser. No. 772,077
3 Claims. (Cl. 29—458)

The invention relates to metal joining and more specifically to a new method for joining a metal tube to another metal tube or to another metal member having an internal passage.

The invention enables two fluid carrying members to be mechanically interlocked and sealed in fluid-tight relationship without employing expensive welding, soldering or brazing operations. The invention finds particular utility in joining refrigerant carrying tubes or conduits of a compression refrigeration system, such as those employed in domestic refrigerators. These systems require numerous joints and connections that must be impervious to both liquids and low density gases, and the cost of making each joint is significant because of the large number of joints made.

In carrying out the invention a first tube or member having a passage therein is provided or prepared to receive a second tube with a small but definite clearance between the contiguous surfaces of the two. An adhesive sealant, such as an epoxy resin, that is adhesive to the metal of both tubes and is substantially impervious to fluids, is then applied to the contiguous surface of one of the tubes; either to the inner surface of the first, or outer, tube, or to the outer surface of the second, or inner tube. The first tube is then worked, as by rolling, to reduce the diameter of the passage therein to cause the first tube to clamp, or grip, the inner tube throughout the extent of the inner tube that is inserted into the outer tube. Simultaneously, with the aforementioned working of the outer tube, the outer tube is grooved to mechanically interlock the two tubes and to produce at least one region in which the adhesive film between the two tubes is reduced to substantially zero thickness. The joint thus formed is heated to cure the adhesive between the tubes, which adhesive during initial heating becomes more fluid than it was previously, so that it flows into interstices or voids in the joint and effects a complete and uniform seal. Continuance of the heating step transforms the adhesive into a tough, flexible and leakproof bonding and sealing agent.

The several objects, advantages and features of the invention will become apparent from the following description in which reference is made to the accompanying drawings, wherein:

FIG. 1 is a longitudinal sectional view through the end of a tube and illustrates a bore sizing operation performed on the tube;

FIG. 2 is a side view of another tube having a coating of adhesive resin on the end thereof;

FIG. 3 is a longitudinal sectional view of a tube joint, illustrating a reducing and grooving operation performed thereon;

FIG. 4 is an elevational view, partially in section, illustrating a completed tube joint formed in accordance with this invention;

FIG. 5 is a somewhat diagrammatic, plan view of a motor-driven machine adapted to form the tube joint shown in FIG. 4.

FIG. 6 is a fragmentary sectional view of the working tool portion of the machine shown in FIG. 5. This view is taken as indicated by the line VI—VI in FIG. 5;

FIG. 7 is a fragmentary perspective view of a plate member having a passage therein; and FIG. 8 is a view similar to FIG. 7 illustrating a joint between the plate and a tube; the joint being formed in accordance with this invention.

FIGS. 1 and 2 respectively illustrate end portions of two tubes 11 and 12 which are to be joined by the method of this invention. In FIG. 1 the tube 11, which is to form the outer tubular portion of the completed joint, is being worked to size the bore thereof to receive an end portion of the inner tube 12. The end portion of tube 11 is clamped between a pair of holding dies 13, and a mandrel 14 is inserted into the bore 15 of the tube to swage and enlarge the bore of the tube. The bore 15 of the tube 11 is sized to receive the inner tube 12 with a slight clearance between the surfaces of the tubes which are contiguous in the completed joint. This oversizing, which can be of the order of .005 inch, insures that a coating of resin adhesive 16, which is applied to the outer surface of the inner tube 12 as shown in FIG. 2, will not be wiped clean from the joint upon insertion of the inner tube into the outer tube. A sizing operation may not be necessary if the outer tube has a bore that is of appropriate size with respect to the outside diameter of the inner tube.

The coating 16 of resinous adhesive is made from a sealant that is adhesive to the metal of both of the tubes or members of the joint. The epoxy class of resins have been determined to be particularly suitable for this application. Such resins are adhesive to the metals commonly employed in refrigeration unit tubing and conduits, such as aluminum, copper and steel, and will function satisfactorily in joints formed from any combination of these metals. The epoxy resins cure, upon the addition of curing agents, into tough, chemical resistance solids which have sufficient flexibility to withstand normal mechanical and thermal distortions encountered by joints such as those used in domestic refrigeration systems. When cured, these resins are relatively impermeable to air and refrigerants, such as dichlorodifluoromethane and other refrigerants in common use today, and are compatible with both refrigerants and oil.

Various epoxy resin formulations are commercially available, each of which displays characteristic properties. For the purpose of forming joints in accordance with this invention, resins should be selected which display the following properties: Tensile strength of the order of 8 to 12,000 p.s.i. at 80° F., flexural modulus of elasticity from 1 to $2.5 \times 10^5$ p.s.i., and tensile shear strength of 3 to 4,000 p.s.i.

A suitable adhesive can be obtained by mixing together 100 parts by weight of curable epoxy resin, 50–100 parts by weight of a filler, such as silica flour, powdered metal oxide or asbestos, 25–50 parts by weight of a flexibilizer, such as polyamide having an amine value of over 200, a polysulphide or fatty diamine, and 6 parts by weight of curing agent, such as triethylenetetramine. This adhesive is cured by heating to 150° F. for 60 minutes. The tube ends to be joined should be clean and free from oils or greases which might interfere with adhesion of the resin to the metal. Dipping the ends of the tubes in acid cleaning solution, rinsing and drying improves resin adhesion. In addition, if copper tubing is employed in the joint a better bond between the adhesive and the copper can be obtained if the surface of the tube is mechanically cleaned, as by steel wool brushing, and oxidized in an oxyacetylene flame.

The coated end portion of tube 12 is inserted into the sized end of tube 11 and the outer tube worked, preferably throughout the extent thereof which overlaps the end of tube 12, to reduce the bore 15 of the outer tube and cause the outer tube to grip and clamp the inner tube. In accordance with this invention, during this reducing operation the outer tube is also grooved in one or more spaced areas within the region of the tube 11 that is reduced. FIG. 3 illustrates the manner in which this reducing and grooving operation is performed. The overlapping portion of the outer tube 11 is worked between one or more smooth-surfaced cylindrical rollers 17 and another roller 18 having annular rings 19 on the surface thereof. Moving rollers 17 and 18 about the tube joint while progressively reducing the distance between the two rollers effects a uniform reduction in the outer diameter of the outer tube 11 throughout the extent of the joint as a result of the cylindrical surface of roller 17 and, additionally, effects further reduction of spaced areas of the outer tube to form grooves 20 in the outer surface of the tube 11.

This working of the outer tube 11 is preferably carried to the point where the outer tube 11 tightly grips the inner tube 12 and the layer of resinous adhesive 16 between the two tubes is reduced to a thin film. The additional reduction of the outer tube at the grooves 20 is carried to the extent that it produces actual deformation of the inner tube 12, as shown at 21 in FIG. 4. This deformation of the inner tube 12 by grooving the outer tube 11 mechanically interlocks the two tubes and produces annular areas 22 between the two tubes in which there is virtually no adhesive 16 present.

The purpose of producing one or more annular voids 22 in the adhesive film 16 between the tubes is to provide stop areas against cracks or fissures 23 which might develop in the adhesive film 16 as the result of mechanical distortion of the joint. It is generally understood that a break once started in a resinous solid tends to progressively open through the body. In the joint illustrated in FIG. 4, the two spaced voids 22 block off a central adhesive film 24 from the portions of the adhesive film 16 at the ends of the joint. Mechanical deformation of the joint, as by bending, is most likely to initiate cracks or fissures 23 at the ends of the joint. The stop voids 22 prevent such failures from progressing into the middle region 24, insuring the maintenance of a continuous adhesive film about the joint.

Simultaneously reducing the diameter of the outer tube 11 and grooving the outer tube by subjecting the joint to the action of both a cylindrical surface reducing roller and a ringed grooving roller insures that deformation of the tube under the action of the grooving roller will not result in the outer tube opening up in regions to each side of and between the grooves 20. To insure a successful joint for refrigeration applications the outer tube 11 should grip the inner tube 12 tightly throughout their overlapping region so that the adhesive film will be both thin and uniform throughout the length of the joint, except beneath the grooves 20 where there is virtually no adhesive present.

During curing of the adhesive 16, which operation may be performed at room temperature or at an elevated temperature by placing the joint in an oven, the adhesive 16 becomes more fluid before hardening and flows into voids or interstices which might be present in the film of adhesive 16 following the working operation on the joint. In this connection, a resinous mixture is preferably employed which is cured by the application of heat and which is more fluid at elevated temperatures than at room temperature.

FIGS. 5 and 6 illustrate a motor-driven machine for performing the reducing operation on a tube joint of the type described above. These illustrations are somewhat diagrammatic in that only the principal components of the machine are shown. The machine comprises a base plate 30 upon which is mounted a rotatable working, or reducing, tool, indicated generally by the reference numeral 31. The tool 31 is adapted to be driven about a horizontal axis by an air motor 32 which is equipped with a suitable reversing valve 33. Compressed air is supplied to the motor 32 from a pipe 34 under control of a valve 35 which also controls the supply of air to a pair of pneumatic cylinders 36 which drive a pair of movable clamping dies 37. Each movable clamping die cooperates with a stationary clamping die 38 in gripping and holding one of the tubes 11 and 12 to prevent rotation of the tubes during the reducing operation.

The air motor 32 drives the reducing tool 31 through a 90° angle gear reduction 39 which is connected to a worm pinion 40 by a shaft 41.

The pinion 40 drivingly engages the toothed periphery of one of two support discs 42 forming a part of the reducing tool 31. The discs 42 are maintained in parallel spaced relationship for conjoint rotation by means of spaced studs 43, and carry therebetween two cylindrical rollers 44 and a grooving roller 45 having a pair of spaced annular rings 46 thereon. The rollers 44 and 45 are carried between the tool discs 42 for rotation, each about its own axis, which axes are all parallel to one another and parallel to the axes of the tubes 11 and 12 being joined. The axes of rotation of the cylindrical rollers 42 are fixed with respect to the tool discs 42. The grooving roller 45, however, is mounted between the discs 42 on trunnions 47 which protrude through arcuate slots 48 in the discs 42. Each slot 48 extends rearwardly with respect to the direction of rotation of the tool 31 (indicated by the arrow in FIG. 6) and progressively inwardly toward the axis of rotation of the tool 31, which axis is common with the axes of the tubes 11 and 12. The geometry of the system of rollers 44 and 45 and the tube 11 is such that upon rotation of the tool 31 (counterclockwise as viewed in FIG. 6) the arcuate slots 48 guide the grooving roller 45 inwardly on the tube 11 and provide progressive wedging of the roller rings 46 into the outer surface of the tube 11. The tube 11 is also forced against the cylindrical reducing rollers 44 to effect a uniform reduction in the diameter of the tube 11 throughout the length of the joint, except of course for the regions having the annular grooves 20 which are produced by the grooving roller 45.

Each tool disc 42 has a slot 49 extending from the periphery thereof inwardly to include an open region 50 about the center of the disc. The pinion 40 which engages the toothed periphery of one of the tool discs 42 is made longer than the width of the slot 49 at the periphery of the disc so that there is continuous driving engagement between the pinion and the disc, even when the slot 49 is rotated past the pinion.

The procedure for performing the reducing operation on two tubes 11 and 12 with the machine shown in FIGS. 5 and 6 is as follows: The overlapping portions of the interfitting tubes are inserted into the reducing tool 31 through the slots 49 and positioned loosely between the rollers 44 and the roller 46. Portions of each tube 11 and 12 outward of the joint are positioned to be gripped between clamping dies 37 and 38. Having placed the tubes in the machine, the operator opens valve 35, admitting compressed air to the two cylinders 36, which immediately effect closing of the clamping dies 37 and 38. Compressed air is also admitted to the motor 32 which drives the reducing tool 31 through several complete revolutions to effect the necessary reduction in the diameter of the outer tube 11. The operator next reverses the direction of rotation of the air motor 32 by means of the reversing valve 33 to rotate the reducing tool 31 in the opposite direction and cause the grooving roller 45 to back off the tube 11. Closure of the valve 35 thereafter stops the motor 32 and releases the pneumatic pressure in the cylinders 36 to retract the movable clamping dies and permit removal of the formed joint from the machine.

This invention is applicable to the art of joining a tubular member to another metal member having an internal passage therein. For example, in domestic refrigeration systems it is frequently necessary to join a refrigerant carrying tube to a heat exchanger, such as an evaporator, which is made of sheet metal and has refrigerant passages formed therein. FIG. 7 illustrates an inlet (or outlet) portion of a heat exchanger plate 50 having a passage 51 formed therein. A completed joint between the passage in the plate 50 and a tube 52 is illustrated in FIG. 8. In accordance with this invention, this joint is formed in the following manner: The plate passage 51 is cleaned and swaged, or otherwise sized, to receive an end portion of the tube 52 with slight radial clearance between the two. The end of the tube 52 is coated with a resin adhesive 53, such as the epoxy resin mixture described above, and the coated end of the tube 52 is inserted into the passage. Thereafter, opposite faces of the heat exchanger plate 50 in the region of the plate into which the tube 52 projects are worked to reduce the size of the passage 51 to cause the plate to grip the tube. At the same time, arcuate grooves 55 are formed in the heat exchanger plate on opposite sides of the end of the tube 52. This working of the heat exchanger plate 50 can be accomplished in a press utilizing die members having faces shaped like the depressed region identified as 54 in FIG. 8. The working of the heat exchanger 50 is preferably carried to the extent that arcuate grooves are formed about the outer surface of the tube 52 so that there is mechanical interlocking of the plate 50 and the tube 52 in the same manner as was produced in the joint illustrated in FIG. 4. The joint thus formed is thereafter heated to cure the resin adhesive 53 and complete the sealing of the joint.

While the invention has been described with reference to but two embodiments thereof, it will be apparent to those skilled in the art that it is not so limited, but is susceptible of various other changes and modifications without departing from the spirit thereof.

What is claimed is:

1. A method of joining metallic tubing comprising the steps of providing a first tube having an end portion adapted to receive an end portion of a second tube with radial clearance between the contiguous surfaces of the two tubes, coating the contiguous surface of at least one of said tubes with a heat curable, epoxy resin which is adhesive to the metal of both tubes, inserting said end portion of the second tube into the bore of said first tube, working the first tube to reduce the diameter thereof throughout the length thereof which overlaps the second tube to cause said first tube to grip said second tube, simultaneously working at least two spaced annular regions of the first tube within said length to further reduce the diameter of said regions, the reduction in said regions being sufficient to deform both of said tubes radially inwardly and to reduce the thickness of the resin in said regions substantially to zero, and thereafter heating the joint to cure said resin whereby said regions of substantially zero thickness epoxy resin will prevent cracks or fissures that develop at the ends of the joint from progressing entirely through the length of the epoxy resin bond.

2. A method of joining metallic tubing comprising the steps of providing one tube with a bore adapted to receive a portion of another tube with radial clearance between the two, coating the inner tube with a heat curable, epoxy resin which is adhesive to the metal of both tubes, inserting the inner tube into the outer tube, rolling two spaced annular grooves in the outer surface of a portion of the outer tube that overlaps said inner tube while uniformly rolling said surface in regions between and to each side of said grooves to reduce the diameter of said outer tube and cause said outer tube to grip said inner tube, the rolling of said grooves being sufficient to deform both of said tubes radially inwardly and to reduce to substantially zero thickness the resin beneath said grooves, and heating the joint thus formed to cure said resin whereby said regions of substantially zero thickness epoxy resin will prevent cracks or fissures that develop at the ends of the point from progressing entirely through the length of the epoxy resin bond.

3. The method of joining a metal tube to a thin walled metal member having a tubular passage therein sized to receive an end portion of said tube with radial clearance between the tube and the member, comprising the steps of coating the outer surface of said portion of the tube with a heat curable, epoxy resin which is adhesive to said tube and said member, inserting said portion of the tube in said passage, working said member in the region thereof which overlaps said tube to reduce the diameter of said passage to close said member about said tube and simultaneously further working at least two spaced areas of said member within said region circumferentially of said tube to deform said member and said tube radially inwardly of the tube in said areas and to reduce to substantially zero thickness the resin in said areas, and thereafter curing said resin by the application of heat to the joint whereby said regions of substantially zero thickness epoxy resin will prevent cracks or fissures that develop at the ends of the joint from progressing entirely through the length of the epoxy resin bond.

References Cited in the file of this patent

UNITED STATES PATENTS

| | | |
|---|---|---|
| 604,863 | Hoyer | May 31, 1898 |
| 1,329,479 | Savon | Feb. 3, 1920 |
| 1,911,775 | Smith et al. | May 30, 1933 |
| 2,335,414 | Hinrichs | Nov. 30, 1943 |
| 2,718,485 | Samuely | Sept. 20, 1955 |
| 2,741,498 | Elliott | Apr. 10, 1956 |
| 2,782,495 | Beck et al. | Feb. 26, 1957 |
| 2,876,725 | Buck et al. | Mar. 10, 1959 |